3,116,314
ORGANOPHOSPHORUS COMPOUNDS AND
METHODS OF PREPARING SAME
Nancy Day, Greenwich, and Martin Epstein, Stamford,
Conn., assignors to American Cyanamid Company,
New York, N.Y., a corporation of Maine
No Drawing. Filed Apr. 7, 1961, Ser. No. 101,334
2 Claims. (Cl. 260—465)

The present invention relates to new and useful organophosphorus compounds, and more particularly to 2,4,6-triaryl-1,3-dioxa-5-substituted-phosphacyclohexanes corresponding to the formula

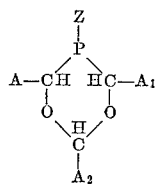

wherein A, $A_1$ and $A_2$ each represent phenyl, substituted phenyl or naphthyl, typical substituents for phenyl being halogen (Cl, Br and I), nitro, hydroxy, lower alkoxy, lower alkyl, and the like; and Z represents $CNCH_2CH_2$, phenyl and substituted phenyl, said substituents for phenyl being coextensive in scope with those for moieties A, $A_1$ and $A_2$, above.

Quite surprisingly, pursuant to the instant discovery, it has been found that a primary phosphine, such as cyanoethylphosphine, phenylphosphine, or a substituted phenylphosphine will react with an aryl aldehyde such as benzaldehyde, napthaldehyde, or a substituted benzaldehyde in the presence of an aqueous mineral acid solution to produce the corresponding 2,4,6-triaryl-1,3-dioxa-5-substituted-phosphacyclohexane of the formula given hereinabove. If desired, a water-soluble inert organic solvent may be present, such as tetrahydrofuran, dioxane, a lower aliphatic monohydric alcohol, acetonitrile, the dimethyl ether of ethylene glycol, and the like.

The aqueous mineral acid employed in the reaction of a primary phosphine with an aryl aldehyde, as defined above, doubles as catalyst and solvent. Among the mineral acids contemplated herein are HCl, HBr, HI, $H_2SO_4$, and the like. While dilute mineral acids are preferred, concentrations in the broad range of 0.1 to 8 normal are suitable for the present invention.

In general, the reactions of the instant discovery are carried out at temperatures in the range of 0° C. to 80° C., preferably, 15° C. to 60° C.

Among the various substituted benzaldehydes suitable for the present invention, in addition to benzaldehyde and 1-naphthaldehyde, are 4-tolualdehyde, 4-chlorobenzaldehyde, 4-bromobenzaldehyde, 2-chlorobenzaldehyde, 2,4-dichlorobenzaldehyde, 4-methoxybenzaldehyde, 3-nitrobenzaldehyde, 4-hydroxybenzaldehyde, 4-iodobenzaldehyde, 2,4-hydroxybenzaldehyde, and the like.

Typical primary phosphines within the purview of the instant discovery are, of course, cyanoethyl phosphine and phenylphosphine. In addition, numerous others are contemplated, such as 4-methylphenylphosphine, 2,4-dimethylphenylphosphine, 4-chlorophenylphosphine, 3-nitrophenylphosphine, 4-hydroxyphenylphosphine, 4-ethoxyphenylphosphine, and the like.

The amount of aldehyde employed in the reaction with respect to the primary phosphine reactant is, generally, at least 3 molar equivalents of aldehyde per molar equivalent of phosphine. However, ratios of aldehyde to primary phosphine in the range of 2:1 to 10:1 or greater, are suitable.

The novel products of the present invention are useful as gasoline additives. For example, up to about 10 grams of any one of the 2,4,6-triaryl-1,3-dioxa-5-substituted-phosphacyclohexanes produced as described hereinabove, when dissolved in one gallon of gasoline, affords protection against pre-ignition, mis-firing, and the like.

The present invention will best be understood by reference to the following illustrative examples. The limitations contained in these examples, unless they appear in the appended claims, are not to be considered as restrictions upon the scope of the invention, since it will be obvious to one skilled in the art that numerous modifications within the purview of the instant discovery are possible and, by the same token, are contemplated herein.

EXAMPLE I 2,4,6-Triphenyl-1,3-Dioxa-5-Phenylphosphacyclohexane

To a solution of 6.2 grams (0.056 mole) of phenylphosphine dissolved in 40 milliliters of acetonitrile is added 18.0 grams (0.17 mole) of benzaldehyde and 1 milliliter of concentrated hydrochloric acid. The solution is allowed to stand at 25° C. for 24 hours and the solid that precipitates is filtered and washed with ether. The product is collected to give 12.2 grams (53 percent by weight of the amount theoretically producible) of 2,4,6-triphenyl-1,3-dioxa-5-phenylphosphacyclohexane, melting point 188° C.–192° C. A purer sample is prepared by recrystallization from acetonitrile, melting point 195° C.–198° C.

Analysis.—Calculated for $C_{27}H_{23}O_2P$: C, 79.01; H, 5.65; P, 7.55. Found: C, 79.19; H, 5.66; P, 7.95.

EXAMPLE II 2,4,6-Tri(p-Chlorophenyl)-1,3-Dioxa-5-(2-Cyanoethyl) Phosphacyclohexane Mono(2-cyanoethyl)phosphine (17.4 grams, 0.2 mole) is added to a solution of 56.4 grams (0.4 mole) of p-chlorobenzaldehyde in 100 milliliters of tetrahydrofuran and 17 milliliters of concentrated HCl. After stirring for 1 hour at 30° C. the solvent is removed under vacuum to leave a viscous liquid. The syrup is triturated with water and ethanol is added to precipitate a white solid. The solid is collected and dried to give 27 grams (41 percent by weight of the amount theoretically producible when based on the phosphine) of 2,4,6-tri(p-chlorophenyl)-1,3-dioxa-5-(2-cyanoethyl)phosphacyclohexane. Recrystallization from ethanol gives an analytical sample, melting point 197° C.–200° C.

Analysis.—Calculated for $C_{24}H_{19}O_2PCl_3N$: C, 58.74; H, 3.90; N, 2.85; P, 6.31; molecular weight 490.8. Found: C, 57.97; H, 3.68; N, 2.86; P, 6.30; molecular weight 480.

EXAMPLES III–XII

Example I, above, is repeated in every essential respect with the exception of the conditions given in the following table:

TABLE I

| Example | Phosphine | Aldehyde | Molar Ratio, P:A | Mineral Acid | Mineral Acid Concentration (Normal) | Solvent | Temperature, °C. | Product |
|---|---|---|---|---|---|---|---|---|
| III | 4-methylphenylphosphine. | 1-naphthylaldehyde. | 1:3 | HCl | 2.0 | dioxane | 50 | 2,4,6-tri(1-naphthyl)1,3-dioxa-5(4-methylphenyl)phosphacyclohexane. |
| IV | 2,4-dimethylphenylphosphine. | 4-methylbenzaldehyde. | 1:7 | $H_2SO_4$ | 0.5 | ethanol | 20 | 2,4,6-tri(4-methyl-phenyl)1,3-dioxa-5(2,4-dimethylphenyl)phosphacyclohexane. |
| V | 4-chlorophenylphosphine. | 4-bromobenzaldehyde. | 1:4 | HBr | 3.5 | acetonitrile | 10 | 2,4,6-tri(4-bromophenyl)1,3-dioxa-5(4-chlorophenyl)phosphacyclohexane. |
| VI | 3-nitrophenylphosphine. | 2-chlorobenzaldehyde. | 1:2 | HI | 8.0 | methanol | 80 | 2,4,6-tri(2-chlorophenyl)1,3-dioxa-5(3-nitrophenyl)phosphacyclohexane. |
| VII | 4-hydroxyphenylphosphine. | 2,4-dichlorobenzaldehyde. | 1:10 | $H_2SO_4$ | 0.5 | tetrahydrofuran | 15 | 2,4,6-tri(2,4-dichlorophenyl)1,3-dioxa-5(4-hydroxyphenyl)phosphacyclohexane. |
| VIII | 4-ethoxyphenylphosphine. | 4-methoxybenzaldehyde. | 1:3 | HCl | 2.0 | acetonitrile | 5 | 2,4,6-tri(4-methoxyphenyl)1,3-dioxa-5(4-ethoxyphenyl)phosphacyclohexane. |
| IX | 2,4-dimethylphenylphosphine. | 3-nitrobenzaldehyde. | 1:6 | HBr | 8.0 | butanol | 0 | 2,4,6-tri(3-nitrophenyl)1,3-dioxa-5(2,4-dimethylphenyl)phosphacyclohexane. |
| X | 4-hydroxyphenylphosphine. | 4-hydroxybenzaldehyde. | 1:8 | $H_2SO_4$ | 0.5 | acetonitrile | 17 | 2,4,6-tri(4-hydroxy-phenyl)1,3-dioxa-5(4-hydroxyphenyl)phosphacyclohexane. |
| XI | 3-nitrophenylphosphine. | 4-iodobenzaldehyde. | 1:4 | HI | 3.5 | dioxane | 25 | 2,4,6-tri(4-iodophenyl)1,3-dioxa-5(3-nitrophenyl)phosphacyclohexane. |
| XII | phenylphosphine. | 2,4-dihydroxybenzaldehyde. | 1:3 | HCl | 2.0 | dimethyl ether of ethylene glycol. | 40 | 2,4,6-tri(2,4-dihydroxyphenyl)1,3-dioxa-5-phenyl phosphacyclohexane. |

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A 2,4,6-triaryl-1,3-dioxa-5-substituted-phosphacyclohexane of the formula

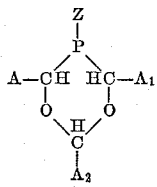

wherein A, $A_1$ and $A_2$ each represent a member selected from the group consisting of phenyl, substituted phenyl and naphthyl, said substituents for phenyl being selected from the group consisting of chlorine, bromine, and iodine, nitro, hydroxy, lower alkoxy and lower alkyl; and Z represents 2-cyanoethyl.

2. 2,4,6-tri(4-chlorophenyl)-1,3-dioxa-5-(2-cyanoethyl) phosphacyclohexane.

References Cited in the file of this patent
UNITED STATES PATENTS
3,005,020   Buckler _____ Oct. 17, 1961